United States Patent
Furui

(10) Patent No.: US 8,586,904 B2
(45) Date of Patent: Nov. 19, 2013

(54) CORRECTION INFORMATION CALCULATOR, IMAGE CORRECTION DEVICE, IMAGE DISPLAY SYSTEM, CORRECTION INFORMATION CALCULATION METHOD

(75) Inventor: Shiki Furui, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 339 days.

(21) Appl. No.: 13/022,160

(22) Filed: Feb. 7, 2011

(65) Prior Publication Data

US 2011/0210979 A1 Sep. 1, 2011

(30) Foreign Application Priority Data

Feb. 26, 2010 (JP) ................. 2010-042467

(51) Int. Cl.
*H01L 27/00* (2006.01)
(52) U.S. Cl.
USPC ......................... 250/208.1; 353/94
(58) Field of Classification Search
USPC ....... 250/208.1, 221, 214 R; 353/94, 69, 101; 348/745–747, 135; 345/682, 699; 382/275, 282, 300
See application file for complete search history.

(56) References Cited

U.S. PATENT DOCUMENTS 6,128,132 A * 10/2000 Wieland et al. ............... 359/463

FOREIGN PATENT DOCUMENTS

| JP | A-2004-363665 | 12/2004 |
| JP | A-2006-14356 | 1/2006 |
| JP | A-2008-113176 | 5/2008 |

* cited by examiner

*Primary Examiner* — Que T Le
(74) *Attorney, Agent, or Firm* — Oliff & Berridge, PLC

(57) ABSTRACT

A correction information calculator in which a plurality of projectors each including an image forming element collaboratively displays one image on a projection surface, wherein based on predetermined correction information which is set in advance as a correspondence between the coordinates of pixels on the image forming element and the coordinates of pixels on a first effective projection region of the projection surface on which the image is presently displayed and a second correspondence which is a correspondence between the coordinates of the pixels on the first effective projection region and the coordinates of pixels on a second effective projection region of the projection surface, which is specified as a region on which the image is to be displayed, correction information representing a correspondence between the coordinates of pixels on the image forming element and the coordinates of pixels on the second effective projection region is calculated.

13 Claims, 9 Drawing Sheets

CORRECTION INFORMATION CALCULATOR, IMAGE CORRECTION DEVICE, IMAGE DISPLAY SYSTEM, CORRECTION INFORMATION CALCULATION METHOD

BACKGROUND

1. Technical Field

The present invention relates to a correction information calculator, an image correction device, an image display system, and a correction information calculation method.

2. Related Art

In the related art, projectors are used for presentations in exhibitions, seminars, meetings, and the like, or home theater systems. Such projectors are also used for point-of-sale advertising. Since the use of projectors makes it easy to display an image on a larger screen than a direct-view type display device such as a display, projectors are highly convenient and can present the same image to many more people. In recent years, various developments have been made to cope with the market demands for high-quality projection images.

For example, when the central axis of the rays of image light emitted from a projector is projected in a direction intersecting the normal line of a projection surface (screen), or when a projection optical system of the projector has an aberration, a projection image projected onto the projection surface has a distortion. For example, an image that is to be displayed in a rectangular shape is projected as a distorted shape such as a trapezoidal shape or a rhombic shape.

As a method of correcting and eliminating this distortion, a method disclosed in JP-A-2004-363665 is known. In the method disclosed in JP-A-2004-363665, the coordinates of the four corners of a projection region of a projector are specified, and a distortion of an image is corrected so that the image is displayed within the range surrounded by the four corners, whereby a distortion-free projection image can be projected.

Moreover, the projection image projected by the projector depends on the number of pixels of an image forming element of the projector, such as a liquid-crystal light valve or a DMD (Digital Mirror Device). Therefore, in order to increase the resolution of the projection image projected by the projector, it is necessary to use an image forming element having a high resolution. However, such a high-resolution image forming element is expensive and is not suitable for general purposes.

In order to solve such a problem, a system that projects one image using a plurality of projectors has been developed (for example, see JP-A-2006-14356). In the system disclosed in JP-A-2006-14356, one image is divided into a plurality of projection images to be projected and displayed by a plurality of projectors, and the projection images are combined by superimposing the outer edges of the projection images of the respective projectors, whereby the projection images are projected as one image. In the following description, the image displayed by combining the projection images projected by the plurality of projectors is sometimes referred to as an "entire image." Moreover, in the following description, the projection image projected from each of the plurality of projectors is sometimes referred to as a "partial image."

Moreover, the maximum projectable range in which the projectable ranges of the respective projectors are put together is not necessarily rectangular. Therefore, in the system disclosed in JP-A-2006-14356, the projection images are captured by a digital camera, and a distortion of the projection region is corrected based on the captured images, so that a rectangular image can be displayed. For example, when the projection surface is a rolling screen, the projection image may have a distortion due to looseness or rippling of the screen. In the system disclosed in JP-A-2006-14356, such an image distortion is automatically corrected based on the captured images.

The use of such a system enables the resolution of the projection image to be increased by an amount corresponding to the number of used projectors even when the projectors have an image forming element having a normal resolution. Moreover, since the number of light sources also increases as the number of used projectors increases, if the size of the projection image is the same, it is possible to display a brighter image than the image projected by one projector. In addition, it is possible to display a distortion-free image.

However, in the system that automatically corrects the image distortion as disclosed in JP-A-2006-14356, the captured image itself may have a distortion when the central axis of the rays of light entering, for example, the digital camera is at a certain angle (shooting angle) with respect to the normal line of the projection surface. In that case, there is a difference in the distortion manner of the actual projection image and the captured image. Thus, correction is not made properly, and a distortion remains in the entire image (the projection region in which the entire image is projected).

In such a case, the user may try to make correction in order to eliminate the distortion of the entire image being projected. However, according to the existing correction methods, it is difficult to adjust the shape of the entire image while maintaining a state where the entire image is smoothly connected and displayed.

By combining the existing techniques, a correction method can be considered in which a distortion correction (first correction) is performed so as to eliminate a distortion of an entire image distorted with respect to image data to determine a region in which an ideal entire image is to be displayed, and then a position correction (second correction) is performed so as to divide corrected image data to create data of images (partial images) to be projected by respective projectors. However, since this correction method involves two correction operations on the image data, the image data are deteriorated greatly, leading to an image quality deterioration. Thus, the computation load increases, and the correction takes a lot of processing time. Therefore, it is unable to display videos without delay, for example.

SUMMARY

An advantage of some aspects of the invention is that it provides a correction information calculator that calculates correction information for correcting the shape of a projection region to suppress a quality deterioration of a projection image that is projected using a plurality of projectors. Another advantage of some aspects of the invention is that it provides an image correction device that creates image data that enable one image to be divided and displayed by a plurality of projectors using such correction information. Still another advantage of some aspects of the invention is that it provides an image display system which includes such a device and which is capable of displaying one image in a favorable manner using a plurality of projectors. Yet another advantage of some aspects of the invention is that it provides a correction information calculation method for correcting the shape of a projection region to suppress a quality deterioration of the projection image that is projected using a plurality of projectors.

According to an aspect of the invention, there is provided a correction information calculator used in an image display system in which a plurality of projectors each including an image forming element collaboratively displays one image on a projection surface, wherein based on predetermined correction information which is set in advance as a correspondence between the coordinates of pixels on the image forming element and the coordinates of pixels on a first effective projection region of the projection surface on which the image is presently displayed and a second correspondence which is a correspondence between the coordinates of the pixels on the first effective projection region and the coordinates of pixels on a second effective projection region of the projection surface, which is specified as a region on which the image is to be displayed, correction information representing a correspondence between the coordinates of images on the image forming element and the coordinates of pixels on the second effective projection region is calculated.

According to this configuration, when a region in which an image is to be displayed is changed from the first effective projection region to the second effective projection region, it is possible to calculate the correction information which enables an image to be displayed in conformity to the shape or position of the second effective projection region after change based on a known correspondence through one correction. Since the shape of the projection region can be corrected through one correction operation by using the calculated correction information, it is possible to prevent a deterioration of the image data caused by repeated correction operations and perform correction through quick computation.

In the correction information calculator, it is preferable that based on a projection transform equation relating to a projection transform that converts the coordinates of four corners of the first effective projection region into the coordinates of four corners of the second effective projection region, the second correspondence is calculated using the converted coordinates of the pixels on the first effective projection region as the coordinates of the pixels on the second effective projection region.

According to this configuration, by using the correspondence between the four corners of the first effective projection region and the four corners of the second effective projection region as the representative correspondence between the coordinates of the pixels on the first effective projection region and the coordinates of the pixels of the second effective projection region, it is possible to calculate the second correspondence. For example, when the projection surface has no uneven shape, and the correspondence between the coordinates of the pixels on the first effective projection region and the coordinates of the pixels on the second effective projection region can be calculated through a simple geometric transform, it is possible to calculate the correction information with a low computation load.

In the correction information calculator, it is preferable that the coordinates of a plurality of first feature points are set on an original image defined by image data representing the image, the coordinates of the plurality of first feature points are converted by an inverse transform of the projection transform defined by the projection transform equation to calculate the coordinates of a plurality of second feature points corresponding to the plurality of first feature points in a one-to-one correspondence, and a correspondence between each of a plurality of third feature points which is arbitrarily set on the second effective projection region and four second feature points surrounding each of the third feature points is calculated as the second correspondence.

According to this configuration, the correspondence between the pixels on an original image and the pixels on the first effective projection region is presumed as the correspondence between the coordinates of a plurality of imaginary feature points (first feature points) in the original image and the coordinates of a plurality of second feature points obtained by converting the plurality of first feature points through an inverse transform of a projection transform defined by the projection transform equation. In addition to this, by setting a plurality of imaginary feature points (third feature points) corresponding to the first feature points on the original image in the second effective projection region and calculating the correspondence between the second feature points and the third feature points, the second correspondence is calculated. Therefore, it is possible to calculate the second correspondence more accurately and calculate the correction information with higher precision based on the second correspondence.

According to another aspect of the invention, there is provided an image correction device that extracts partial images to be displayed by a plurality of projectors based on image data representing one image which is collaboratively displayed by the plurality of projectors and creates partial image data corresponding to the partial images, including; the correction information calculator according to the above aspect; an input unit to which the image data are input; an image processing unit that calculates a correspondence between pixels on the image forming element and pixels on a whole projection region in which respective projection regions of the plurality of projectors are put together, extracts data that is to be input to pixels on the image forming element corresponding to a region in the whole projection region, on which the image is to be displayed, from the image data, and converts the coordinates of pixels defined by the extracted data using the correction information calculated by the correction information calculator to create the partial image data; and an output unit that outputs the partial image data to the plurality of projectors.

According to this configuration, it is possible to provide an image correction device that creates partial image data which enable an image defined by the input image data to be faithfully reproduced using the calculated correction information, and which enable a distortion-free entire image to be displayed using the calculated correction information.

According to still another aspect of the invention, there is provided an image display system in which a plurality of projectors collaboratively displays one image, including: the image correction device according to the above aspect; and a plurality of projectors to which the partial image data created by the image correction device are input, and which projects the partial images based on the partial image data.

According to this configuration, it is possible to provide an image display system capable of displaying a distortion-free entire image on a large screen, with a high resolution, or with a high luminance.

According to yet another aspect of the invention, there is provided a correction information calculation method used in an image display system in which a plurality of projectors each including an image forming element collaboratively displays one image on a projection surface, the method including: calculating a first correspondence which is the correspondence between the coordinates of pixels on the image forming element and the coordinates of pixels on a first effective projection region of the projection surface; specifying a second effective projection region of the projection surface, different from the first effective projection region; and calculating correction information representing the correspondence between the coordinates of the pixels on the image forming element and the coordinates of the pixels on the second effective projection region based on the first correspondence and a second correspondence which is the correspondence between the coordinates of the pixels on the first effective projection region and the coordinates of the pixels on the second effective projection region.

According to this method, when a region in which an image is to be displayed is changed from the first effective projection region to the second effective projection region, it is possible to calculate the correction information which enables an image to be displayed in conformity to the shape or position of the second effective projection region after change based on a known correspondence through one correction. Thus, it is possible to perform correction with a low computation load and through quick computation. Moreover, it is possible to prevent a deterioration of the image data caused by repeated correction operations.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a correction information calculator, an image correction device, an image display system, and an image correction method according to an embodiment of the invention will be described with reference to FIGS. 1 to 11. In all of the following drawings, the dimensions, proportions, and the like of the respective constituent elements are appropriately illustrated differently from the actual ones in order to make the drawings easy to see.

Figure 1:
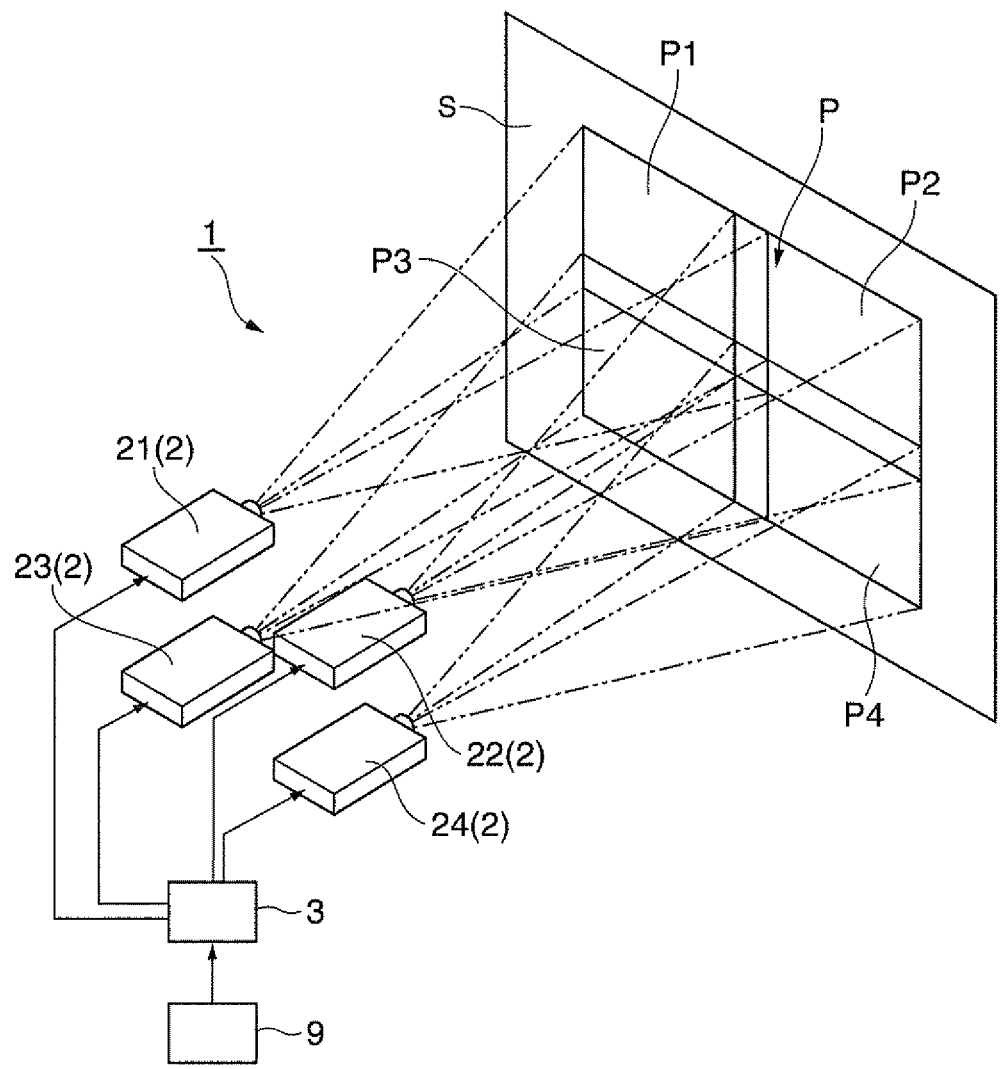
FIG. 1 is a schematic diagram showing an image display system according to an embodiment of the invention.

FIG. 1 is a schematic diagram showing an image display system according to the present embodiment. As shown in FIG. 1, the image display system 1 of the present embodiment includes a plurality of projectors 2 and an image processor (image correction device) 3. A correction information calculator according to the invention is included in the image processor 3 as will be described later.

Although four projectors 2 are illustrated in the figure, the number and arrangement thereof are not limited to this. In this example, for the sake of convenience, it is assumed that the projectors 2 include first to fourth projectors 21 to 24. Each of the projectors 21 to 24 includes an image forming element that forms a projection image. As the image forming element, a liquid-crystal light valve, a DMD (digital mirror device), and the like can be used.

The image processor 3 divides image data input from a signal source 9 into a plurality of pieces of partial image data and creates partial image data corresponding to partial images associated with the respective projectors. The first to fourth projectors 21 to 24 display the partial images on a projection surface S based on the partial image data input from the image processor 3.

That is, the image processor 3 causes the first projector 21 to display a first partial image P1 based on partial image data on the projection surface S. Similarly, the image processor 3 causes the second, third, and fourth projectors 22, 23, and 24 to display second, third, and fourth partial images P2, P3, and P4, respectively. The first to fourth partial images P1 to P4 are displayed on the projection surface S with the respective outer edges superimposed, thus forming one projection image P as a whole.

In such an image display system 1, image data input from the signal source 9 such as a personal computer or a DVD player is divided into a plurality of pieces of partial image data, and the partial images are projected by a plurality of projectors 2, whereby one combined image (entire image) is displayed. Therefore, it is possible to increase the number of pixels included in a projection image P compared to a projection image displayed by one projector, and to increase the resolution of the projection image P. When the resolution is increased in this way, it is possible to decrease the cost of projectors compared to a case where the number of pixels of a projection image displayed by one projector is increased to increase the resolution of the displayed image.

Moreover, since the amount of light contributing to the display of the projection image P can be increased by an amount corresponding to the number of projectors, it is possible to display a high-luminance projection image P. Furthermore, the projectors may be used individually in normal cases, and when there is a need to display images on a large screen, with a high resolution, or with a high luminance, the projectors may form an image display system to collaboratively display the images.

Figure 2:
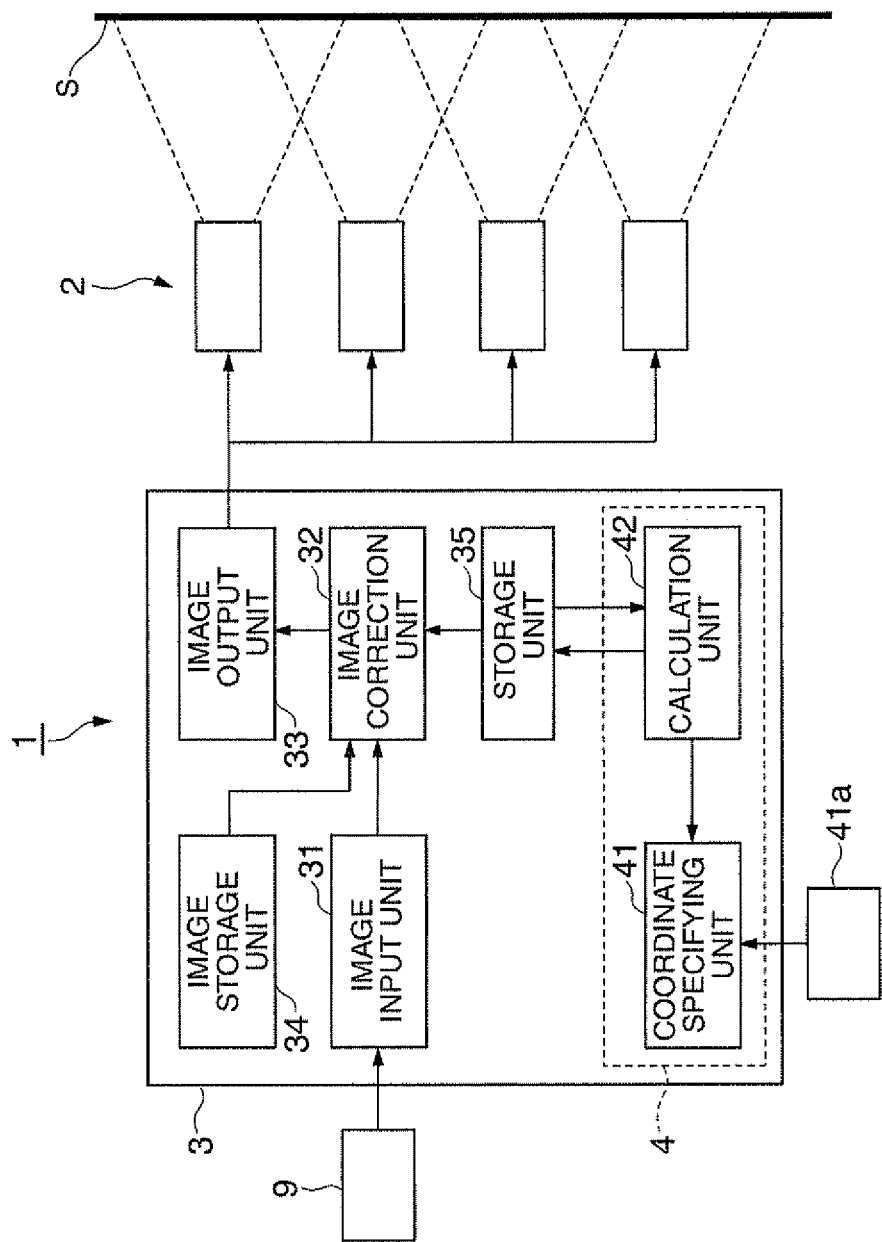
FIG. 2 is a diagram illustrating a detailed configuration of the image display system according to the embodiment of the invention.

FIG. 2 is a diagram illustrating a detailed configuration of the image display system 1. In this section, the configuration will be described mainly of the image processor 3 and the correction information calculator 4 included in the image processor 3.

The image processor 3 extracts partial images to be displayed by the respective projectors 21 to 24 based on the image data representing one image P which is collaboratively displayed by a plurality of projectors 2 and creates partial image data corresponding to the partial images. The partial images are parts of the image P to be displayed by the respective projectors.

The image processor 3 includes an image input unit (input unit) 31 to which image data of movies, still images, or the like are input from the signal source 9, an image processing unit 32 that corrects the image data in accordance with correction information calculated by the correction information calculator 4 and appropriately divides the corrected image data to create partial image data, an image output unit (output unit) 33 that outputs the partial image data to the projectors 2, an image storage unit 34 that stores measurement patterns shown in FIG. 2 or image data such as movies or still images used for display, and a storage unit 35 that stores the correction information. A general capture board or the like can be used as the image input unit 31, and a GPU (Graphics Processing Unit) or the like can be used for the image processing unit 32 and the image output unit 33.

The image processing unit 32 calculates a correspondence between the pixels on the image forming element of the plurality of projectors 2 and the pixels on a whole projection region on the projection surface including the respective projection regions of the plurality of projectors 2. Then, the image processing unit 32 extracts data, from the image data, which are to be input to the pixels on the image forming element corresponding to regions in the whole projection region on which images are to be displayed. Then, the image processing unit 32 converts the coordinates of the pixels defined by the extracted data using the correction information calculated by the correction information calculator 4 to create the partial image data.

The correction information calculator 4 includes a coordinate specifying unit 41 that detects and specifies the coordinates of four points input by a user through an input device 41a such as a mouse or a keyboard and a calculation unit 42 that calculates new correction information corresponding to the projection regions of the respective projectors using the correction information stored in the storage unit 35. The coordinate specifying unit 41 and the calculation unit 42 are programs allowing a CPU (Central Processing Unit), which is provided to be shared by the image processor 3 or is provided individually to the correction information calculator 4, to perform desired computation processing. The correction information calculator 4 is a device that executes these programs to calculate desired correction information. The correction information calculator 4 may be configured as an independent device separated from the image processor 3.

Next, image display processing by the image display system 1 having such a configuration will be described with reference to FIGS. 3 to 11B. In the following description, in line with the flow mainly of computation processing by the calculation unit 42 shown in FIG. 2, the respective image processings and the functions of the respective configurations shown in FIG. 2 will be described using the names and reference numerals of the respective configurations shown in FIG. 2 as necessary.

Figure 3:
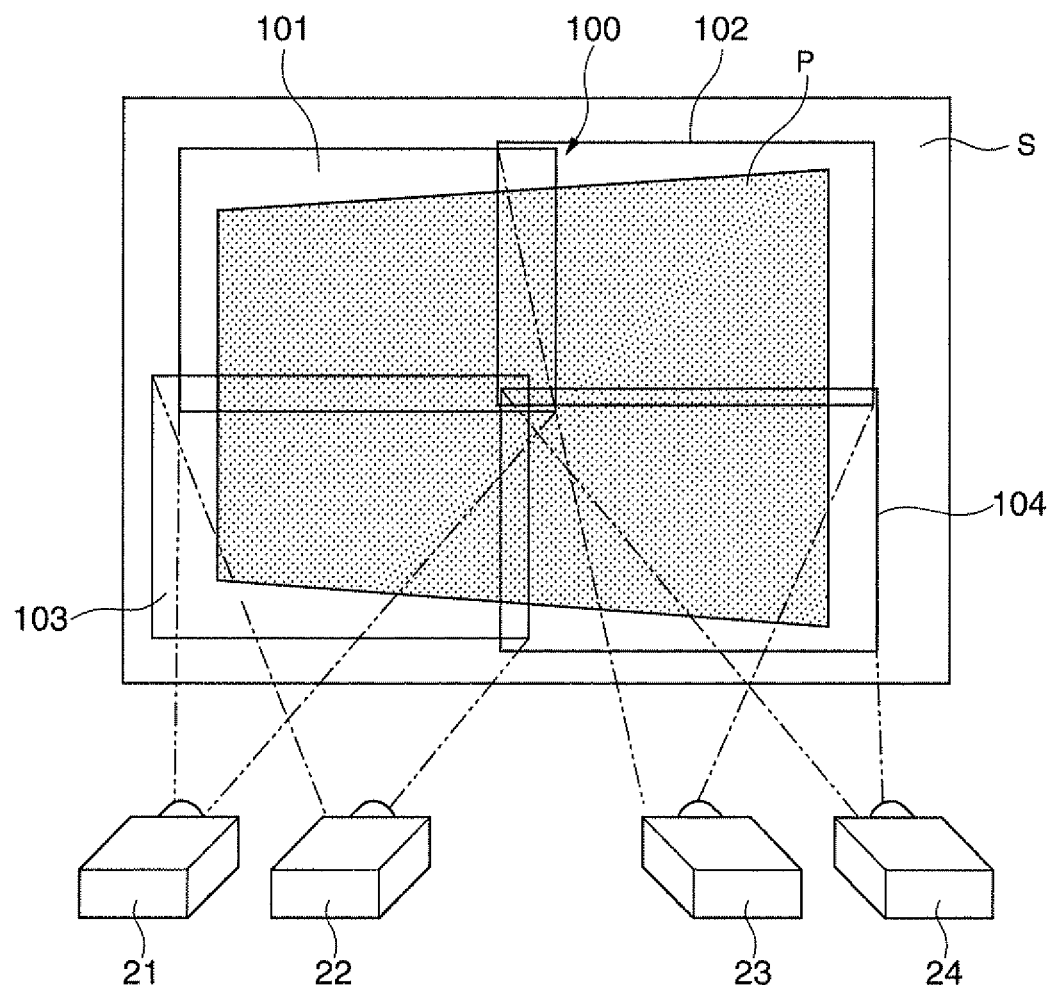
FIG. 3 is a diagram illustrating image processing when images are displayed using the image display system.

FIG. 3 is a diagram illustrating a state in which the image display system 1 projects images towards the projection surface S. As shown in FIG. 3, the respective projectors 21 to 24 project one image P into a whole projection region 100 in which respective projection regions 101 to 104 are put together with the outer edges thereof partially superimposed. In other words, the image P is displayed over the entire area of an effective projection region (first effective projection region) 105 which is set inside the whole projection region 100.

When the image P is projected, the correction information (predetermined correction information) which represents the correspondence between the coordinates of the pixels on the image forming element of the respective projectors and the coordinates of the pixels on the images projected onto the projection surface S from the respective projectors is calculated, and then, the image data that define the image P are corrected based on the predetermined correction information.

Figure 4A:
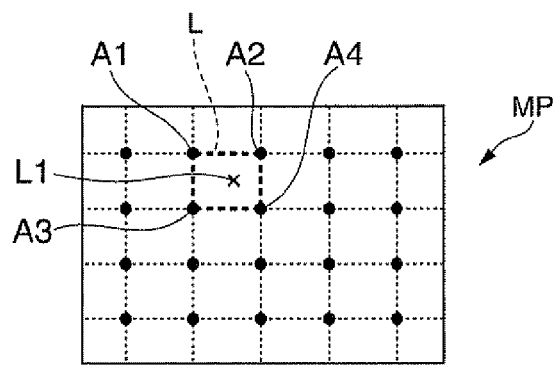
FIGS. 4A to 4C are diagrams illustrating image processing when images are displayed using the image display system.
Figure 4B:
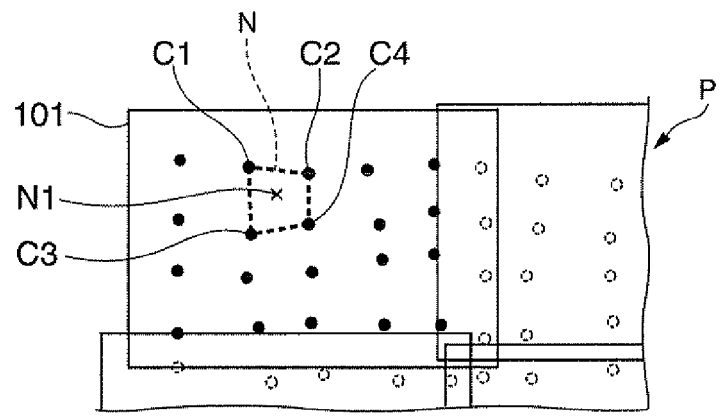

A method of calculating the predetermined correction information will be described in detail with reference to FIGS. 4A to 4C. First, image data representing a measurement pattern MP as shown in FIG. 4A in which dots (feature points) are arranged, for example, in a matrix of 4 rows by 5 columns are input to the image forming element of the respective projectors and displayed on the projection surface (FIG. 4B). Then, from the correspondence between four neighboring feature points A1 to A4 in the measurement pattern MP represented by the image data and the corresponding feature points C1 to C4 on the image P corresponding to the feature points A1 to A4, the predetermined correction information which is the correspondence between a pixel L1 in a region L surrounded by the feature points A1 to A4 and a pixel N1 in a region N surrounded by the feature points C1 to C4 is calculated.

The pixel N1 is the corresponding point in the image P displayed on the projection surface corresponding to the pixel L1. The predetermined correction information can be calculated, for example, by correlating the coordinates of the feature points A1 to A4 defined by the image data representing the measurement pattern MP with the coordinates of the feature points C1 to C4 in a captured image obtained by capturing the image P displayed on the projection surface.

In order to faithfully reproduce an image represented by the image data on the projection surface S using the predetermined correction information, the image forming element LV calculates a correspondence representing the positions at which the image data are input and which are shifted from the pixels defined by the image data. That is, feature points B1 to B4 corresponding to the feature points A1 to A4 are calculated from the feature points A1 to A4 defined by the image data as points located at the positions on the image forming element LV, which are shifted from the feature points A1 to A4 based on the predetermined correction information. Moreover, since a pixel M1 in a region M surrounded by the feature points B1 to B4 on the image forming element LV, which corresponds to the pixel L1 in the region L surrounded by the feature points A1 to A4 is defined by the predetermined correction information, it is possible to correct the image data based on the correspondence (FIG. 4C). Moreover, the pixel M1 is the corresponding point in the image forming element corresponding to the pixel L1.

Figure 5A:
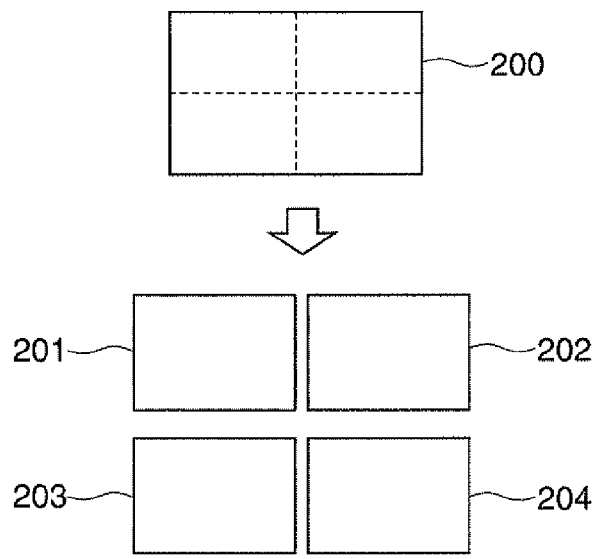
FIGS. 5A to 5C are diagrams illustrating image processing when images are displayed using the image display system.
Figure 5B:
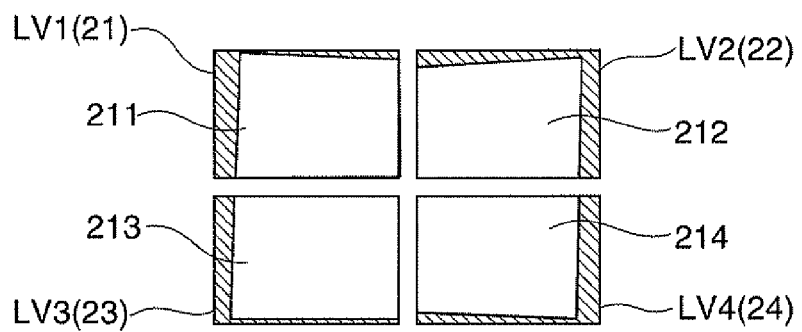
Figure 5C:
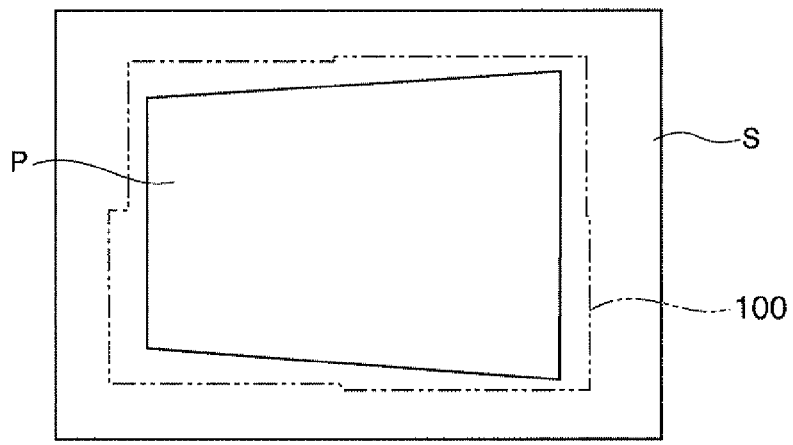

As shown in FIGS. 5A to 5C, when the image data defining the image P are corrected, first, the partial images to be displayed by the respective projectors are extracted from the image data 200 defining the image P to create extraction data 201 to 204 (FIG. 5A). The extraction data 201 to 204 are created by calculating a region of the image forming element to be used for image display from the predetermined correction information and extracting data to be input to the region from the image data 200.

Subsequently, the coordinates of the respective extraction data 201 to 204 are converted into partial image data 211 to 214 corresponding to the coordinates in the image forming elements LV1 to LV4 of the respective projectors 21 to 24 using the predetermined correction information.

The converted partial image data 211 to 214 are input to the image forming elements LV1 to LV4 of the respective projectors through the image output unit 33 (FIG. 5B) and projected onto the projection surface S, whereby the image P is displayed (FIG. 5C).

In an ideal case, through the correction based on the predetermined correction information, there will be no distortion in the contour shape (namely, the outer shape of the effective projection region 105) of the image P on the projection surface S. However, when the predetermined correction information is calculated automatically or there is an aberration in the projection optical systems of the respective projectors, the predetermined correction information calculated may not be error-free, and a distortion may appear even after the correction based on the predetermined correction information is made. In FIGS. 5A to 5C, the effective projection region 105 is distorted into a trapezoidal shape, And the shape of the image P being projected is also distorted in conformity to the distortion of the effective projection region 105.

In the embodiment of the invention, in order to eliminate the distortion of the image P being projected, a user calculates new correction information substituting the predetermined correction information and performs readjustment based on the new correction information.

Figure 4C:
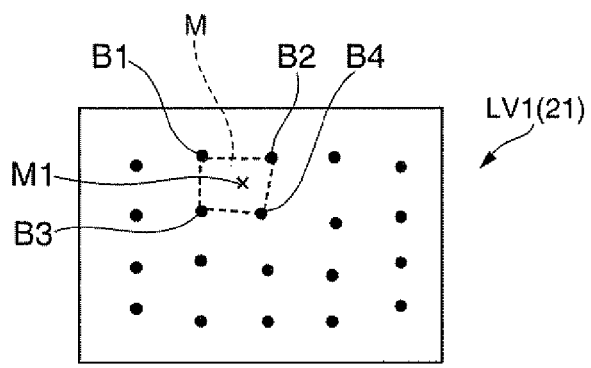

The basic concept relating to the method of calculating the correction information is similar to the concept used when creating the partial image data shown in FIGS. 4A to 4C. That is, the correction information is calculated from the correspondence between four points on the image data and four points corresponding to the image being projected. The difference is that the image of the reference feature points is not actually displayed unlike the method shown in FIGS. 4A to 4C since the image P has already been projected onto the projection surface.

Therefore, in the embodiment of the invention, a plurality of imaginary feature points substituting the dots (feature points) in FIGS. 4A to 4C is set on an image represented by the image data of the image P, and correction information is calculated from the correspondence between the feature points on the image represented by the image data and points which are presumed as the corresponding point on the project ion surface corresponding to the feature points. This will be described in detail below.

Figure 6:
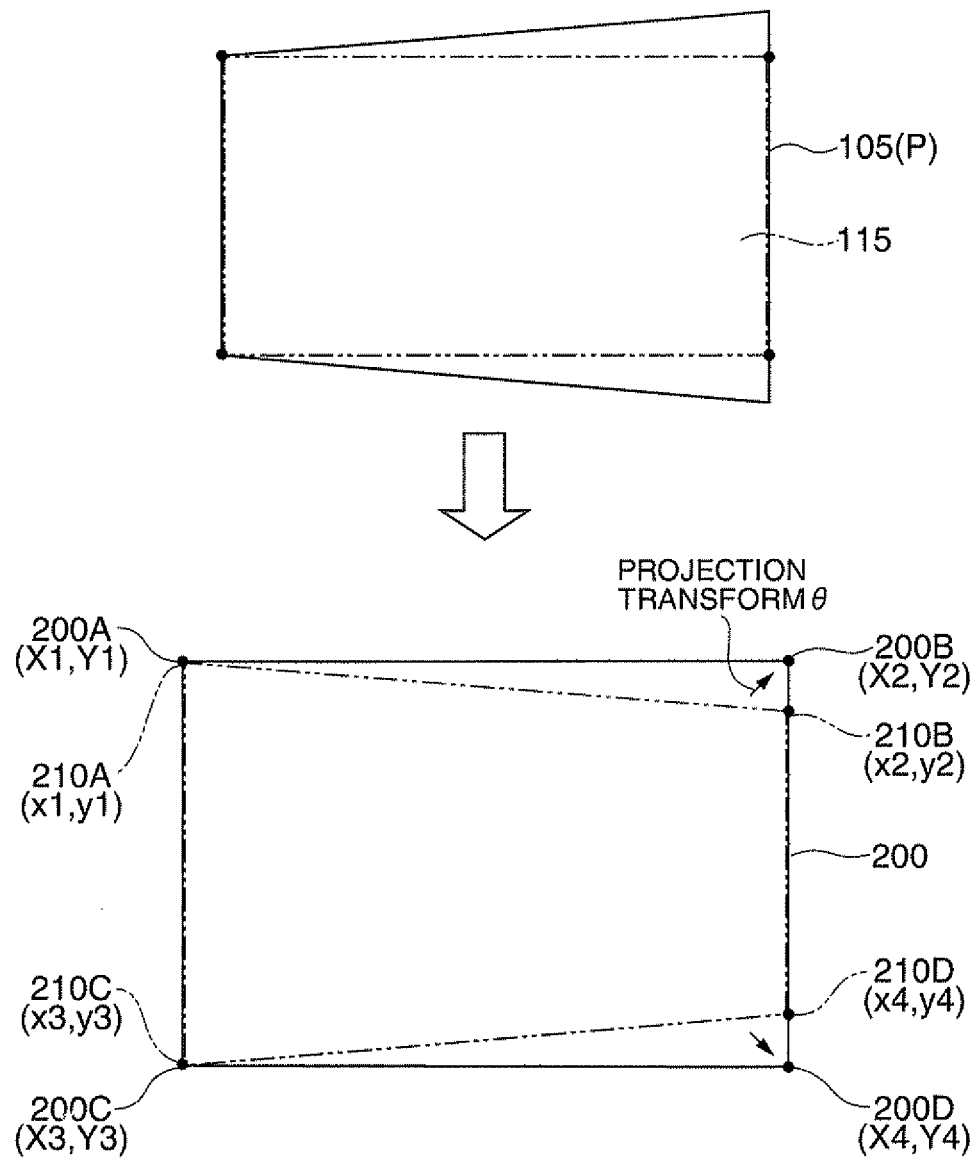
FIG. 6 is a diagram illustrating image processing when images are displayed using the image display system.

First, as shown in FIG. 6, the user inputs the coordinate of four points corresponding to the four corners of a new effective projection region (second effective projection region) 115 substituting the effective projection region 105 in which the image P is displayed while looking at the image P on the projection surface. The coordinates of the four points may be specified by dragging the positions of the four corners of a new effective projection region using a mouse cursor displayed on the image P and may be specified by inputting the positions of the four corners into a dialog box displayed on the image P through a keyboard or the like.

The coordinate specifying unit 41 calculates a projection transform equation relating to a projection transform that converts the coordinates of the specified four points (the four corners of the new effective projection region) to the coordinates of the four corners (the four corners of the present effective projection region) of a region that is presently used for display based on the coordinates of the pixels of the four corners 200A to 200D of a region which is used by the image forming element for displaying the image P (to which the image data 200 of the image P are input) and the coordinates of the four input points 210A to 210D on the image forming element. The same calculated projection transform equation is used for an inverse transform of a projection transform that converts the coordinates of the four corners 200A to 200D to the coordinates of the four input points 210A to 210D.

In FIG. 6, the coordinates of the four input points 210A to 210D are expressed by coordinates $(x_i, y_i)$ (where i is a natural number), and the coordinates of the four corners 200A to 200D are expressed by coordinates $(X_i, Y_i)$ (where i is a natural number). The coordinates having the same variable i are the coordinates of the corresponding feature points before and after the projection transform.

The projection transform can be expressed by the following equations (1) and (2). In the equations, "x" and "y" are the x and y coordinates in the xy orthogonal coordinate system, "X" and "Y" are the X and Y coordinates in the XY orthogonal coordinate system, and the characters "a" to "h" are transformation coefficients. The two coordinate systems have the same origins and the coordinate axes extend in the same directions.

$$x_i = \frac{ax + by + c}{gx + hy + 1} \quad (1)$$

$$y_i = \frac{dx + ey + f}{gx + hy + 1} \quad (2)$$

These equations can be expressed as the following equations (3) and (4).

$$ax+by+c-gxx_i-hyx_i-x_i=0 \quad (3)$$

$$dx+ey+f-gxy_i-hyy_i-y_i=0 \quad (4)$$

Here, the respective coordinates of the four points 210A to 210D before conversion and the respective coordinates of the four corners 200A to 200D are known. Substituting the values thereof into the equations (3) and (4) yields a system of simultaneous equations of 8th degree. Thus, the transformation coefficients a to h can be calculated. In FIG. 6, a projection transform equation with the calculated variables a to h is depicted as θ.

Figure 7:
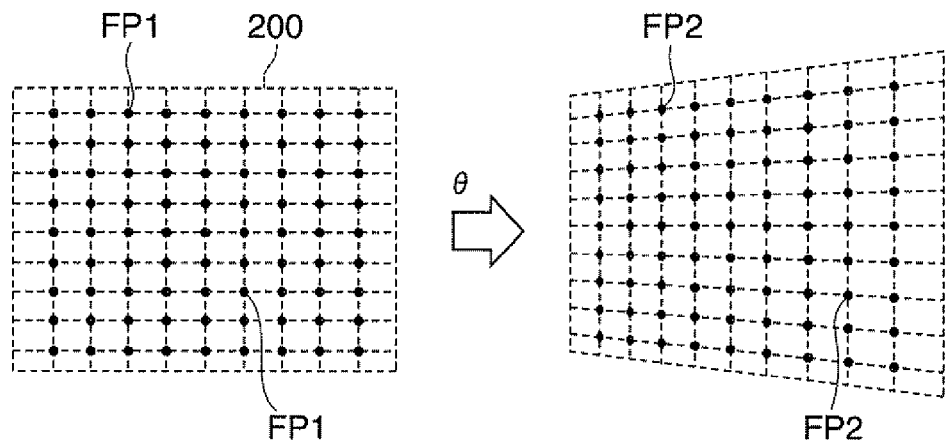
FIG. 7 is a diagram illustrating image processing when images are displayed using the image display system.

Subsequently, as shown in FIG. 7, an imaginary parallel grid having an equal pitch is set on an original image defined by the image data 200, and the coordinates of a plurality of grid points (first feature points) LP1 in the parallel grid are defined. The image data 200 are image data representing one image P. Thereafter, the coordinates of the plurality of first feature points FP1 are converted by the projection transform equation θ to calculate the coordinates of a plurality of second feature points FP2.

The effective projection region at the present stage has a shape obtained by applying a coordinate transform that can be expressed by the projection transform equation θ to a desired shape. Therefore, in an ideal state (an image represented by the image data can be faithfully reproduced by the respective projectors), the coordinates of the plurality of second feature points FP2 obtained by converting the coordinates of the plurality of first feature points FP1 in accordance with the projection transform equation θ can be regarded as the coordinates obtained by performing coordinate transform on the coordinates of the plurality of first feature points FP1 reproduced on the projection surface by an amount corresponding to a present distortion. That is, the coordinates of the second feature points FP2 can be used as the coordinates of the points on the projection surface corresponding to the first feature points FP1 when an image represented by the image data obtained by converting the coordinates based on the predetermined correction information was projected.

Figure 8:
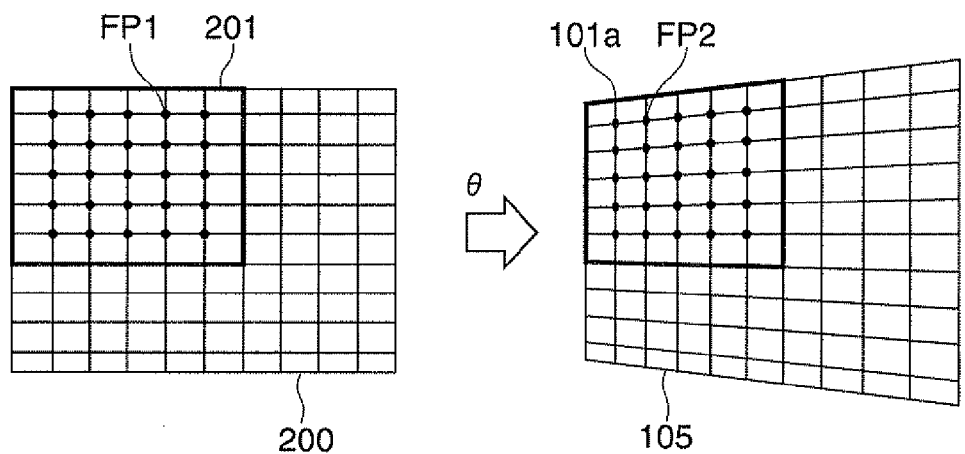
FIG. 8 is a diagram illustrating image processing when images are displayed using the image display system.

Subsequently, as shown in FIG. 8, display regions in the present effective projection region 105, of the respective projectors are calculated from the coordinates of the plurality of second feature points. Since the correspondence between the coordinates of the plurality of first feature points FP1 included in the extraction data 201 and the coordinates of the outer edges of the extraction data 201 is known, it is possible to calculate a display region 101a in the present effective projection region 105, of the projector 21 from these coordinates using the projection transform equation θ. Similarly, the display regions of the other projectors, in the present effective projection region 105 can be calculated.

Figure 9:
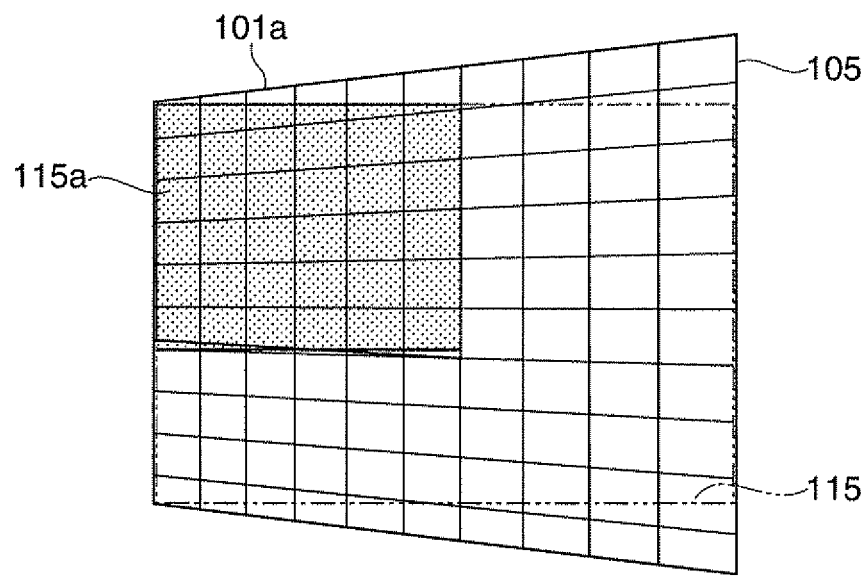
FIG. 9 is a diagram illustrating image processing when images are displayed using the image display system.

Subsequently, as shown in FIG. 9, the specified region 115 shown in FIG. 6 is extracted from the effective projection region 105, and an overlapped portion of the specified region 115 and the display region of each of the respective projectors in the effective projection region 105 is defined as a new display region 115a of each of the respective projectors. In FIG. 9, a display region 115a corresponding to a present display region 101a is displayed as a hatched region.

Figure 10:
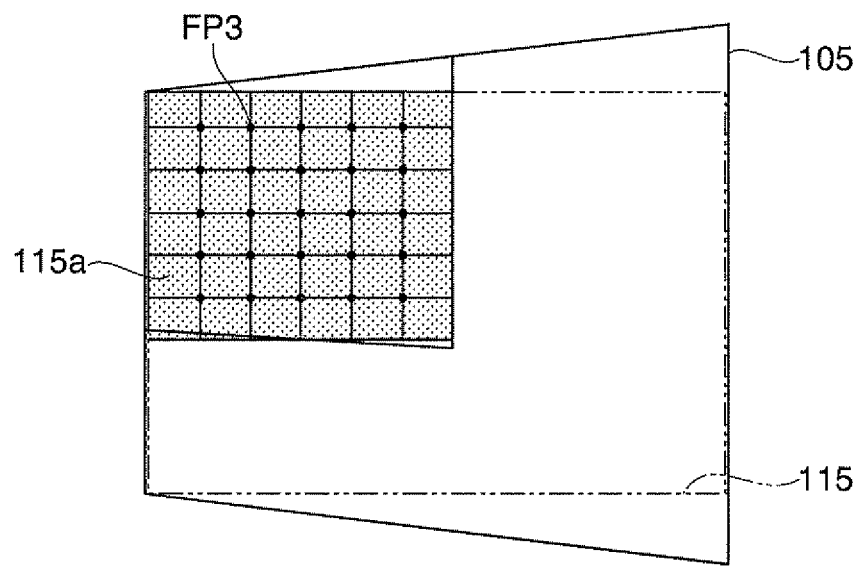
FIG. 10 is a diagram illustrating image processing when images are displayed using the image display system.

Subsequently, as shown in FIG. 10, a plurality of third feature points FP3 corresponding to the plurality of first feature points in a one-to-one correspondence is set on the display region 115a. In the present embodiment, the plurality of third feature points FP3 is set so as to have the same number and the same arrangement as the plurality of first feature points. In this way, the plurality of first feature points FP1 is set on the image represented by the image data 200, and the plurality of third feature points FP3 corresponding to the first feature points FP1 is set in the specified region 115. Thus, by calculating the correspondence between the first feature points FP1 and the third feature points FP3, it is possible to calculate desired correction information.

Figure 11A:
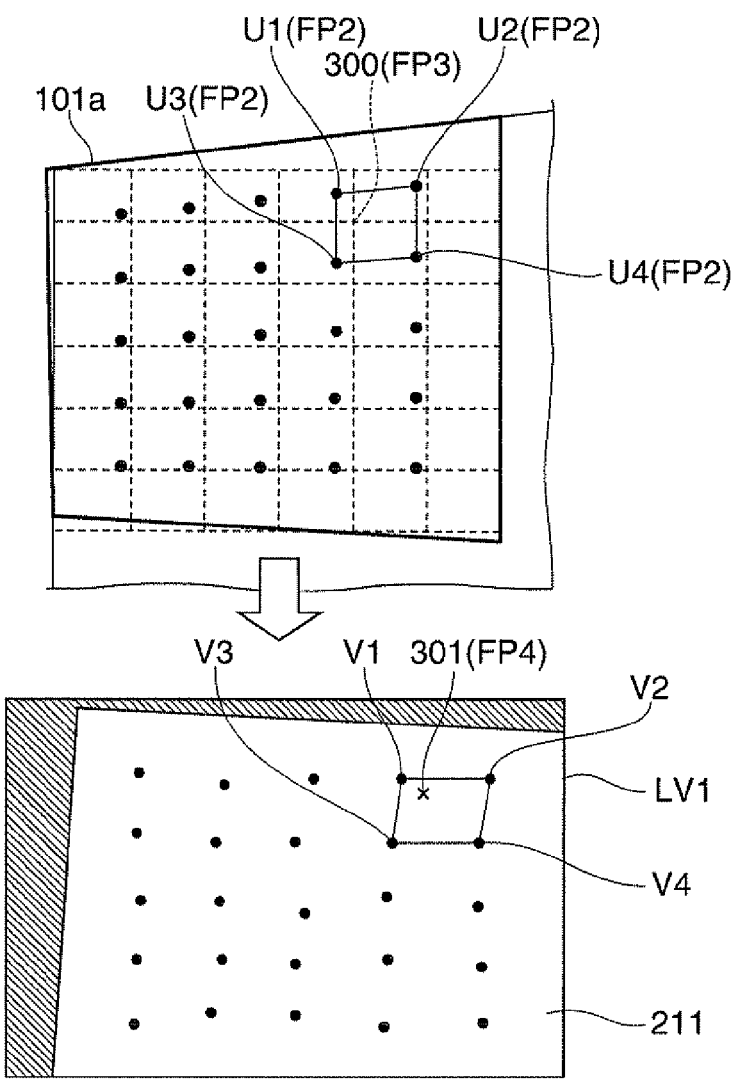
FIGS. 11A and 11B are diagrams illustrating image processing when images are displayed using the image display system.
Figure 11B:
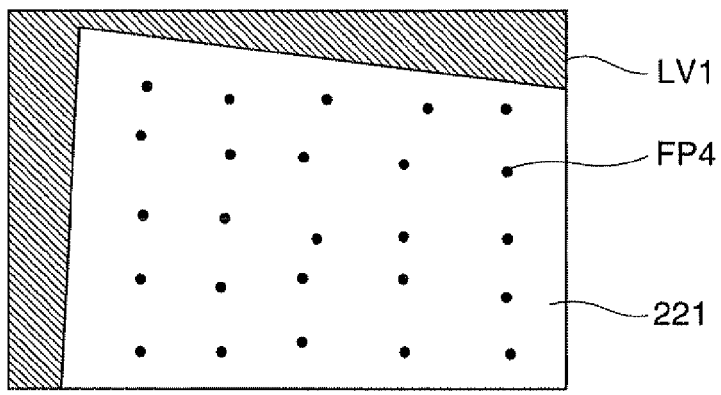

That is, as shown in FIGS. 11A to 11C, since the points on the image forming element LV1 corresponding to the plurality of second feature points can be calculated from the predetermined correction information, a third feature point 300 surrounded by the four second feature points U1 to U4 on the display region 101a can be converted to a fourth feature point 301 surrounded by the four points V1 to V4 on the image forming element LV1 corresponding to the four second feature points U1 to U4 (FIG. 11A). The fourth feature point 301 is the corresponding point on the image forming element LV1 corresponding to the third feature point 300. In this way, it is possible to calculate a plurality of fourth feature points FP4 on the image forming element LV1 corresponding to the other third feature points.

In this way, it is possible to calculate the correspondence between the third feature point 300 on the display region 101a and the fourth feature point 301 on the image forming element LV1. Thus, using this correspondence and the coordinates of the four corners of the display region 101a, it is possible to calculate the coordinates of the four corners of a region 221 on the image forming element LV1, to which the image data are to be input in order to project the image in the specified region 115a shown in FIG. 10 (FIG. 11B).

In this way, it is possible to calculate the correction information representing the correspondence between the coordinates of pixels on the image forming element and the coordinates of pixels of an image to be displayed on a new display region in the specified region.

Moreover, in the correction information calculator having such a configuration and the correction information calculation method described above, it is possible to calculate the correction information which enables an image to be displayed in conformity to the shape or position of the second effective projection region after change based on a known correspondence through one correction. Thus, it is possible to perform correction with a low computation load and through quick computation.

Furthermore, in the image correction device having such a configuration, it is possible to create partial image data which enable a distortion-free entire image to be displayed using the correction information. According to the image display system 1 having such a configuration, it is possible to display a distortion-free entire image.

In the present embodiment, although the correction information is calculated from the correspondence between a plurality of second feature points and a plurality of third feature points, the invention is not limited to this. For example, when the projection surface has no uneven shape which is attributable to a distortion, by using the correspondence between the four corners of the first effective projection region and the four corners of the second effective projection region as the representative correspondence between the coordinates of the pixels on the first effective projection region and the coordinates of the pixels on the second effective projection region, it is possible to calculate the correction information that determines the projection transform θ.

Moreover, in the present embodiment, although the third feature points are set so as to have the same number and the same arrangement as the first feature points, the invention is not limited to this. The number of third feature points and the number of rows and columns of the arrangement of third feature points may be set arbitrarily. Even when the number and arrangement of third feature points are different from those of the first feature points, since the point on the image forming element LV1 corresponding to the plurality of second feature points can be calculated from the predetermined correction information, it is possible to calculate the coordinates of pixels on the image forming element corresponding to the third feature points which are set arbitrarily on the second effective projection region.

While the exemplary embodiments of the invention have been described with reference to the accompanying drawings, the invention is not limited to such embodiments. The shapes, arrangements, and the like of the respective constituent elements shown in the above-described embodiments are examples, but may be changed in various ways based on design requirements without departing from the spirit of the invention.

The entire disclosure of Japanese Patent Application No. 2010-42467, filed Feb. 26, 2010 is expressly incorporated by reference herein.

What is claimed is:

1. A correction information calculator used in an image display system in which a plurality of projectors each including an image forming element collaboratively displays one image on a projection surface, comprising:
   a processor configured to calculate correction information, wherein based on predetermined correction information which is set in advance as a correspondence between the coordinates of pixels on the image forming element and the coordinates of pixels on a first effective projection region of the projection surface on which the image is presently displayed and a second correspondence which is a correspondence between the coordinates of the pixels on the first effective projection region and the coordinates of pixels on a second effective projection region of the projection surface, which is specified as a region on which the image is to be displayed, the correction information is calculated based on a correspondence between the coordinates of pixels on the image forming element and the coordinates of pixels on the second effective projection region.

2. The correction information calculator according to claim 1,
   wherein based on a projection transform equation relating to a projection transform that converts the coordinates of four corners of the first effective projection region into the coordinates of four corners of the second effective projection region, the second correspondence is calculated using the converted coordinates of the pixels on the first effective projection region as the coordinates of the pixels on the second effective projection region.

3. The correction information calculator according to claim 2,
   wherein the coordinates of a plurality of first feature points are set on an original image defined by image data representing the image,
   wherein the coordinates of the plurality of first feature points are converted by an inverse transform of the projection transform defined by the projection transform equation to calculate the coordinates of a plurality of second feature points corresponding to the plurality of first feature points in a one-to-one correspondence, and wherein a correspondence between each of a plurality of third feature points which is arbitrarily set on the second effective projection region and four second feature points surrounding each of the third feature points is calculated as the second correspondence.

4. The correction information calculator according to claim 3, wherein the correction information is calculated based on the predetermined correction information and the second correspondence.

5. An image correction device that extracts partial images to be displayed by a plurality of projectors based on image data representing one image which is collaboratively displayed by the plurality of projectors and creates partial image data corresponding to the partial images, comprising:

the correction information calculator according to claim 1;

an input unit to which the image data are input;

an image processing unit that calculates a correspondence between pixels on the image forming element and pixels on a whole projection region in which respective projection regions of the plurality of projectors are put together, extracts data that are to be input to pixels on the image forming element corresponding to a region in the whole projection region, on which the image is to be displayed, from the image data, and converts the coordinates of pixels defined by the extracted data using the correction information calculated by the correction information calculator to create the partial image data; and an output unit that outputs the partial image data to the plurality of projectors.

6. An image correction device that extracts partial images to be displayed by a plurality of projectors based on image data representing one image which is collaboratively displayed by the plurality of projectors and creates partial image data corresponding to the partial images, comprising:

the correction information calculator according to claim 2;

an input unit to which the image data are input;

an image processing unit that calculates a correspondence between pixels on the image forming element and pixels on a whole projection region in which respective projection regions of the plurality of projectors are put together, extracts data that are to be input to pixels on the image forming element corresponding to a region in the whole projection region, on which the image is to be displayed, from the image data, and converts the coordinates of pixels defined by the extracted data using the correction information calculated by the correction information calculator to create the partial image data; and an output unit that outputs the partial image data to the plurality of projectors.

7. An image correction device that extracts partial images to be displayed by a plurality of projectors based on image data representing one image which is collaboratively displayed by the plurality of projectors and creates partial image data corresponding to the partial images, comprising:

the correction information calculator according to claim 3;

an input unit to which the image data are input;

an image processing unit that calculates a correspondence between pixels on the image forming element and pixels on a whole projection region in which respective projection regions of the plurality of projectors are put together, extracts data that are to be input to pixels on the image forming element corresponding to a region in the whole projection region, on which the image is to be displayed, from the image data, and converts the coordinates of pixels defined by the extracted data using the correction information calculated by the correction information calculator to create the partial image data; and an output unit that outputs the partial image data to the plurality of projectors.

8. An image correction device that extracts partial images to be displayed by a plurality of projectors based on image data representing one image which is collaboratively displayed by the plurality of projectors and creates partial image data corresponding to the partial images, comprising:

the correction information calculator according to claim 4;

an input unit to which the image data are input;

an image processing unit that calculates a correspondence between pixels on the image forming element and pixels on a whole projection region in which respective projection regions of the plurality of projectors are put together, extracts data that are to be input to pixels on the image forming element corresponding to a region in the whole projection region, on which the image is to be displayed, from the image data, and converts the coordinates of pixels defined by the extracted data using the correction information calculated by the correction information calculator to create the partial image data; and an output unit that outputs the partial image data to the plurality of projectors.

9. An image display system in which a plurality of projectors collaboratively displays one image, comprising:

the image correction device according to claim 5; and a plurality of projectors to which the partial image data created by the image correction device are input, and which projects the partial images based on the partial image data.

10. An image display system in which a plurality of projectors collaboratively displays one image, comprising:

the image correction device according to claim 6; and a plurality of projectors to which the partial image data created by the image correction device are input, and which projects the partial images based on the partial image data.

11. An image display system in which a plurality of projectors collaboratively displays one image, comprising:

the image correction device according to claim 7; and a plurality of projectors to which the partial image data created by the image correction device are input, and which projects the partial images based on the partial image data.

12. An image display system in which a plurality of projectors collaboratively displays one image, comprising:

the image correction device according to claim 8; and a plurality of projectors to which the partial image data created by the image correction device are input, and which projects the partial images based on the partial image data.

13. A correction information calculation method used in an image display system in which a plurality of projectors each including an image forming element collaboratively displays one image on a projection surface, the method comprising:

calculating a first correspondence which is the correspondence between the coordinates of pixels on the image forming element and the coordinates of pixels on a first effective projection region of the projection surface;

specifying a second effective projection region of the projection surface, different from the first effective projection region; and calculating correction information representing the correspondence between the coordinates of the pixels on the image forming element and the coordinates of the pixels on the second effective projection region based on the first correspondence and a second correspondence which is the correspondence between the coordinates of the pixels on the first effective projection region and the coordinates of the pixels on the second effective projection region.

\* \* \* \* \*